United States Patent [19]
Hurwitz

[11] 3,814,370
[45] June 4, 1974

[54] AIR CUSHION SUPPORTS FOR VEHICLE SEATS

[76] Inventor: Alexander Hurwitz, 33 Yavnieli St., Givatvaim, Israel

[22] Filed: June 26, 1970

[21] Appl. No.: 50,090

[52] U.S. Cl. .............................................. 248/400
[51] Int. Cl. ............................................ F16m 13/00
[58] Field of Search ...... 248/350, 399, 400; 267/34, 267/117, 118, 119, 120, 121, 122, 123

[56] References Cited
UNITED STATES PATENTS

| | | | |
|---|---|---|---|
| 2,878,012 | 3/1959 | Crites | 248/400 X |
| 2,921,781 | 1/1960 | Pemberton | 267/34 |
| 2,989,301 | 6/1961 | Johannsen | 267/34 |
| 3,235,221 | 2/1966 | Conner | 248/400 |
| 3,405,901 | 10/1968 | Gregoire | 248/400 |

Primary Examiner—William H. Schultz
Attorney, Agent, or Firm—Weingarten, Maxham & Schurgin

[57] ABSTRACT

An air-cushion support for vehicle seats comprises an air-filled chamber closed at its upper end by a flexible diaphragm and at its lower end by a rigid base member, a plunger resting on the flexible diaphragm and supporting the vehicle seat, and a spring urging the diaphragm and seat to their upper positions. The air-filled chamber is under normal atmospheric pressure during the unoccupied condition of the vehicle seat and includes a normally closed valve and an operator therefor to vent the chamber interior to the atmosphere when the diaphragm is in its upper non-deflected position.

2 Claims, 2 Drawing Figures

PATENTED JUN 4 1974  3,814,370

INVENTOR
ALEXANDER HURWITZ

BY Benjamin J. Barish
ATTORNEY

AIR CUSHION SUPPORTS FOR VEHICLE SEATS

BACKGROUND OF THE INVENTION

1. Field of the Invention

The present invention relates to air-cushion supports for vehicle seats, such as are used for example in busses, trucks and tractors.

2. Description of the Prior Art

Vehicle seat supports are known, which include a plunger resting on a flexible diaphragm closing the upper end of an air-chamber, the plunger supporting the vehicle seat. The air-chamber is pre-loaded, i.e., it is subjected to a super-atmospheric pressure in the normal, nonoccupied condition of the chair. In such constructions, an air-pressure source must be provided for the super-atmospheric pressure, which means that the support can be used only where the vehicle is equipped with an air pressure system, or where manual pumping is provided to pre-load the air-chamber. Even very small leakage, which is difficult to completely eliminate when the air-chamber is under super-atmospheric pressure, will result in the loss of the super-atmospheric pressure with the passage of time, which has to be made up by the air pressure system or by hand pumping.

Further, the arrangement is usually such that when the driver adjusts the position of the seat to bring it to the proper height for him, this changes the volume of the air chamber, and thereby the cushioning properties of the support. Thus, for tall drivers the support tends to provide a hard cushion because the seat has to be lowered which thereby decreases the volume of the air chamber, and for short drivers the cushion tends to be soft. Also, some constructions include separate means for adjusting the height of the seat and separate means for adjusting the air-pressure. In such systems however the driver must make two adjustments, one for height and the other for air pressure, which is inconvenient of itself, but it is made even more inconvenient by the fact that changing the air pressure also changes the height and therefore requires a further adjustment of height. The foregoing disadvantages are particularly troublesome where there is a frequent change of drivers for the same vehicle.

Another disadvantage of the known constructions is that the super-atmospheric pressure in the air chamber causes a noticeable rebound or bounce-back of the seat, which is a nuisance to the driver.

SUMMARY OF THE PRESENT INVENTION

The present invention aims to provide an air-cushion support for vehicle seats having advantages in the above respects.

According to a broad aspect of the present invention, there is provided an air-cushion support for vehicle seats, comprising, an air-filled chamber closed at its upper end by a flexible diaphragm and at its lower end by a rigid base member, and a plunger resting on the flexible diaphragm and supporting the vehicle seat, the air-filled chamber being under normal atmospheric pressure during the unoccupied condition of the vehicle seat. The latter pressure is increased by the deflection of the flexible diaphragm downwardly towards the rigid base member when the vehicle seat is occupied. A spring urges the diaphragm and the seat to their upper position.

Since in this arrangement the air-chamber is under normal atmospheric pressure during the unoccupied condition of the vehicle seat, it does not require an air pressure system or manual pumping. Also, no adjustment need be made with respect to the air chamber or the air pressure therein, it always being under normal atmospheric pressure in the unoccupied condition of the seat. As will be shown below, a separate adjustment can be provided for height, but this does not affect the air-chamber or the cushioning properties of the support. Further, bounce-back or rebound of the seat is in effect eliminated.

According to a further feature of the present invention, there is included a normally closed valve in the air-filled chamber, and means for opening the valve to vent the interior of the chamber to the atmosphere when the flexible diaphragm is in its upper, non-deflected position. This feature assures that the pressure in the chamber will always be atmospheric during the non-occupied condition of the seat, so as to compensate for any leakage that should occur. However, this feature is not essential if the air-cushion is constructed such that no leakage can occur.

According to a still further feature of the invention, the diameter of the plunger is greatest at its bottom and decreases at an intermediate portion thereof. Preferably, as illustrated in the described embodiment, the plunger is formed with an annular recess just above its bottom to provide said decreased-diameter intermediate portion. Particularly good cushioning properties are produced by this arrangement, as will be described more fully below.

According to a still further feature, the plunger supports the vehicle seat by a linkage system including a pair of arms which are adjustable with respect to each other for adjusting the position of the seat without affecting the volume of the air-filled chamber. Thus, the seat may be adjusted for individual requirements, without affecting the air-cushioning properties of the support.

Further features and advantages of the invention will be apparent from the description below.

BRIEF DESCRIPTION OF THE DRAWINGS

The invention is herein described, by way of example only, with reference to the accompanying drawings, wherein.

DESCRIPTION OF THE PREFERRED EMBODIMENT

Figure 1:
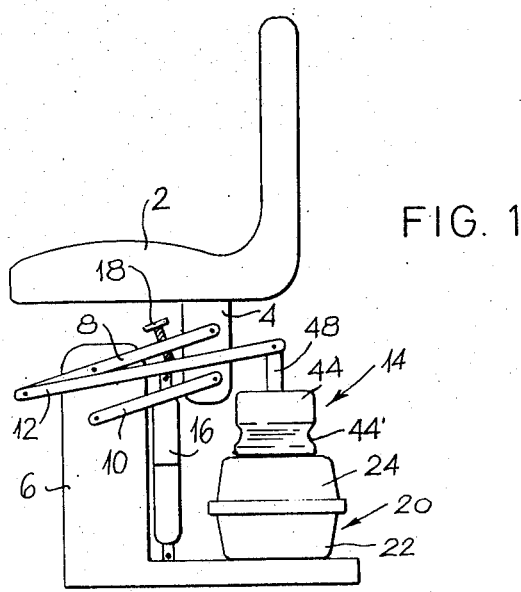
FIG. 1 is a side elevational view of a vehicle seat in combination with an air-cushion support therefor constructed in accordance with the invention.

With reference to FIG. 1, there is shown a vehicle seat 2 carrying a depending mounting post 4 for mounting same to a vertical post 6 of the vehicle. The mounting system includes a parallelogram linkage system including a pair of parallel links 8 and 10 pivotably mounted between posts 4 and 6, and a further link 12 pivotably mounted at one end to link 8 and at the opposite end to the air-cushioned support generally designated 14. Link 12 is also mounted to a shock-absorber 16 of conventional construction. The position of seat 2 may be adjusted for the individual height of the operator by a threaded knob 18 passing through link 8, and bearing against link 12.

The vehicle seat support (FIG. 2) comprises a housing 20 made of two rigid (e.g. metal) sections, namely a lower or base section 22, and an upper or skirt section 24. Lower section 22 is of dish-shape, closed at the bottom, and is there formed with a central circular recess 22'. Upper housing section 24 is of inverted dish shape but is open at the top. A flexible diaphragm 26, of rubber or rubber-like material, also of inverted dish-shape as housing section 24, is applied interiorly of the latter section, the top wall 26' of the diaphragm being exposed at the top of housing 20 because of the open top of section 24. Section 24 and flexible diaphragm 26 are both formed with outwardly extending flanges, 24'' and 26'', respectively, which are engaged by a turned-over flange 22'' of the lower housing section 22 when assembling the parts together.

A coil spring 28 is disposed within housing 20 and bears against the bottom wall of section 22 and against a circular, rigid (e.g. metal) plate 30 underlying the top wall 26' of the flexible diaphragm. Plate 30 is formed with a pair of recesses 30' which receive embossments 32 formed on the under surface of top wall 26' for location purposes.

The bottom wall of the lower housing section 22 includes a valve 34 which is normally biassed to its closed position by a spring 36 interposed between the recessed surface 22' of housing section 22 and a washer 38 carried at the end of the valve stem 40. However, in the normal, non-deflected condition of the flexible diaphragm 26 (as shown in full lines in FIG. 2), valve 34 is pulled open by a flexible wire 42 connected to the valve stem 40 and to circular plate 30, wire 42 passing through an opening formed in a central recess 30'' of the plate 30.

A plunger 44 is coupled to diaphragm 26. For this purpose, the top wall 26' of the diaphragm is integrally formed with an annular lip 45 enlarged at its upper end 45' which is adapted to be received in a recess 46 formed at the lower end of plunger 44, with the lower rim 46' of the plunger snapped onto lip 45 between the top wall 26' of the diaphragm and the enlarged upper end 45' of the lip. Plunger 44 is of cylindrical shape except that it is formed with an annular recess 44' at an intermediate portion thereof, just above the bottom, for a purpose to be described below. The top wall of plunger 44 is formed with a central recess 47 into which sits the lower end of a post 48, the latter post being connected to link 12 of the linkage system illustrated in FIG. 1.

It will thus be seen that within housing 20 there is formed an air-filled chamber which is closed at its upper end by flexible diaphragm 26 and at its lower end by housing section 22. When the vehicle seat 2 is not occupied, i.e. no load is applied to plunger 44, the top wall 26' of the flexible diaphragm will be in its upper position a as shown in full lines in FIG. 2, and the air-filled chamber will be at its maximum volume. In this unloaded condition of the vehicle seat, the pressure within the air-filled chamber is normal atmospheric pressure.

The maintenance of normal atmospheric pressure within the air-chamber under this non-loaded condition of the plunger is assured by wire 42 which pulls valve 44 open to vent the interior of the chamber to the atmosphere.

Figure 2:
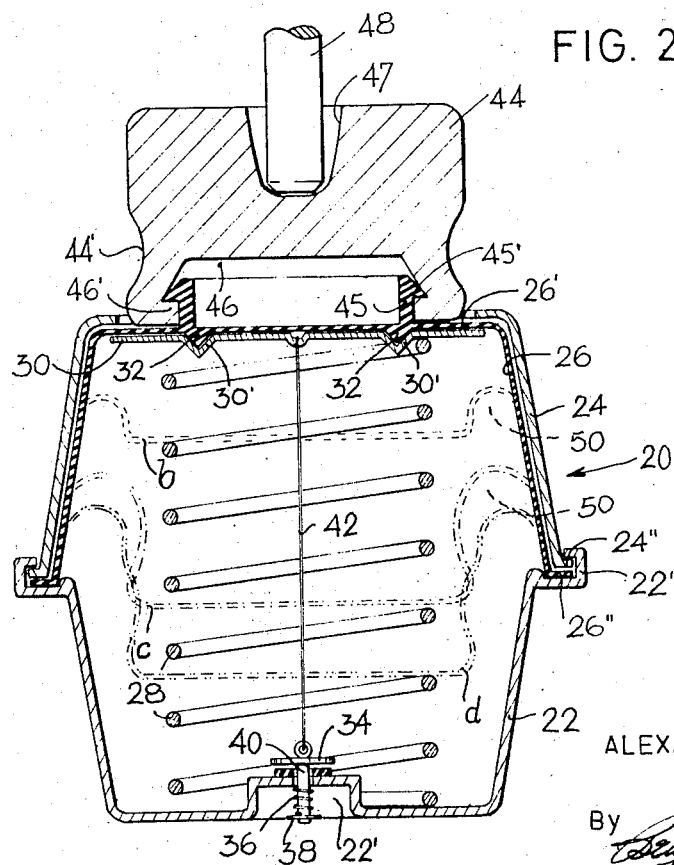
FIG. 2 is an enlarged sectional view of the air-cushion support of FIG. 1, showing the elements in the following positions: full lines $a$, the seat-unoccupied position; broken lines $b$, the positions they assume when the seat is occupied; broken lines $c$, the positions they assume when subjected to normal shocks; and broken lines $d$, their positions under the severest shock.

Now as soon as the operator sits on seat 2, plunger 44 is loaded so that it deflects flexible diaphragm 26 downwardly toward the lower housing section 22, the upper wall 26' of the diaphragm assuming the broken-line position (b) illustrated in FIG. 2. Valve 34 has meanwhile closed because wire 42 no longer can hold it open against the action of spring 36 once the top wall 26' of the diaphragm moves downwardly. When the vehicle is subjected to shocks, these will be cushioned by the further deflection of the top wall 26' of the diaphragm to the broken-line position c. The broken line position d indicates the maximum deflection of top wall 26' under the severest shocks the vehicle is liable to experience.

When the operator removes himself from the vehicle seat, the flexible diaphragm 26 is returned to its normal position under the action of the pressure that has been built up within the air chamber, and also under the action of spring 28. The latter spring can be relatively light, for example to take a load of about 30 kilograms. This is sufficient to assure the return of the flexible diaphragm and the seat, and to take up a part of the weight of the operator, leaving the remainder of the weight and also the shocks to be taken up by the air cushion formed within the air-chamber.

Valve 34 and wire 32 (or other means for opening the valve when the diaphragm has returned to its normal, non-loaded condition) assure that the air chamber will always be under normal atmospheric pressure during the non-loaded condition of the support. For that reason the inclusion of such valve is highly desirable, but is not absolutely essential if the air chamber is constructed so as to be completely sealed against leakage.

The arrangement described has been found to provide very good cushioning properties under all conditions of use. Thus, when the operator sits on the seat, part of his weight (e.g. about 30 kilograms) is taken up by spring 28, and the rest by the deflection of the top wall 26' of the diaphragm to the higher-broken lines position illustrated in FIG. 2. The normal vehicle shocks are absorbed by the further deflection of diaphragm wall 26', the most extreme deflection for the severest shocks being indicated by the lowest broken-line position of the diaphragm wall 26' in FIG. 2.

In the known air cushions of this type, the hardness of the cushion increases rapidly with the deflection of the air-chamber volume thereby. In the present arrangement this decrease in hardness is not so rapid. This is because of the provision of annular recess 44' in the plunger which, together with the inverted dish-shape of diaphragm 26, provides an additional air space 50 in the air chamber above the bottom of the plunger when the latter moves downwardly to deflect diaphragm wall 26'. The influence of this additional air space on the cushioning properties of the support is greatly controlled by the dimensions and location of the annular recess 44'. Thus, the deeper the recess, the greater will be this additional air space, and the less rapid will be the increase in hardness upon deflection of the diaphragm wall 26'. Further, by providing this annular recess just above the bottom of plunger 44, this effect on the cushioning properties of the support will come into play mostly during the absorption of normal shocks experienced by the vehicle. It will be noted that the upper part of the plunger 44 illustrated is of the same diameter as the lower part, which means that for extreme shocks this additional air space 50 will be reduced, and will therefore have a smaller affect on the cushioning properties of the support. In other words, under normal shock conditions, the support will provide a relatively soft cushion, but under extreme shock conditions the cushion will be hard at the end of the deflection to avoid "bottoming" of the seat.

If it is desired to soften the cushion under these extreme shock conditions, the diameter of the upper part of plunger 44 may be reduced, for example to be equal to the diameter at the bottom of recess 44'.

It will be seen that the cushioning properties provided by this support will be greatly determined by the shape and the dimensions of plunger 44. I have found that particularly good cushioning properties are provided if the plunger is of the shape illustrated and the diameter of the lower end of the plunger is about or in the vicinity of 100-110 mm.

It will be thus seen that the described air cushion support requires neither a source of air pressure, nor hand pumping, since the air chamber is normal atmospheric pressure. Valve 34 and its operator (wire 42) assure that this normal atmospheric pressure will always be present even should leakage develop; however, the tendency for leakage is even less here than in the prior known systems where the air chamber is under superatmospheric pressure. It has been found that the cushioning properties of this type of support are very satisfactory for drivers of a wide range of weights, and that it is not necessary to adjust the air cushion for different driver weights. In addition, no noticeable rebound or bounce-back of this seat is present when the driver unseats himself, which was another undesirable characteristic of the super-atmospheric pressure type of air cushion supports.

A further advantage in the arrangement described is the fact that the support may be adjusted, by knob 18, to the proper position according to the individual height of the operator, without affecting the volume of the air-filled chamber. Thus, the cushioning effect produced by the support will be substantially the same even when the seat is adjusted at different heights.

Many changes, variations and applications of the illustrated embodiment may be made.

What is claimed is:

1. An air-cushion support for vehicle seats, comprising an air filled chamber closed at its upper end by a flexible diaphragm and at its lower end by a rigid base member, a plunger resting on said flexible diaphragm and supporting the vehicle seat, said air-filled chamber being under normal atmosheric pressure during the unoccupied condition of the vehicle seat, which pressure is increased by the deflection of said flexible diaphragm downwardly towards said rigid base member when the vehicle seat is occupied, and a spring urging said diaphragm and the seat to their upper positions and further including a normally closed valve in said air-filled chamber, and means for opening said valve to vent the interior of said chamber to the atmosphere when the flexible diaphragm is in its upper, nondeflected position.

2. An air-cushion support for vehicle seats, comprising, an air-filled chamber closed at its upper end by a flexible diaphragm and at its lower end by a rigid base member, a plunger resting on said flexible diaphragm and supporting the vehicle seat, said air-filled chamber being under normal atmospheric pressure during the unoccupied condition of the vehicle seat, which pressure is increased by the deflection of said flexible diaphragm downwardly towards said rigid base member when the vehicle seat is occupied, and a spring urging said diaphragm and the seat to their upper positions and wherein said means for opening the valve comprising flexible wire connected to the valve and the flexible diaphragm such as to apply a pull to the valve to open same only when the flexible diaphragm is in its upper, non-deflected position.

* * * * *